Patented Nov. 28, 1944

2,364,002

UNITED STATES PATENT OFFICE 2,364,002

MAGNESIA-CONTAINING REFRACTORIES

Robert A. Schoenlaub, Tiffin, Ohio, assignor to Basic Refractories, Inc., Cleveland, Ohio, a corporation of Ohio No Drawing. Application July 28, 1942,
Serial No. 452,610

16 Claims. (Cl. 106—59)

Magnesia is extensively used in refractories in metallurgical hearths, furnace parts, etc., periclase refractories being made from magnesites, brucites, bittern or sea water precipitates, and similar materials. These materials are calcined at high temperatures to render the product dense, impervious, chemically resistant and volume-stable. The resulting granular product or clinker may be used in this form for hearths, or may be sized, bonded and formed into structural shapes. A major problem in the manufacture and use of periclase refractories is the control of substances associated with magnesia raw materials. The natural impurities in commercial magnesia materials, if properly managed, permit refractories to be made at lower cost, and in suitable instances improve the product, such as by acting as bonding agents, preventing destructive absorption by encasement of the periclase grains, and the breaking of the continuity of the natural cleavage planes of periclase, etc. Minor constituents commonly found in commercial periclase refractories are orthosilicates, and the particular kind of orthosilicate is determined by the ratio of lime and silica present. Lime and magnesia will combine with silica to form dicalcium silicate ($2CaO.SiO_2$), merwinite ($3CaO.MgO.2SiO_2$)

monticellite ($CaO.MgO.SiO_2$), or forsterite ($2MgO.SiO_2$)

depending as the CaO:$SiO_2$ ratio changes to 2:1, 3:2, 1:1, and 0:1, respectively. Lime preferentially combines with silica to form any one or more of these silicates which the ratio may permit, calcium oxide being a stronger base than magnesia. The properties of periclase refractories are, to a large extent, determined by the amount and kind of silicates present. Clinkers containing 8 to 15 per cent silicate can give very satisfactory results. Clinkers containing dicalcium silicate or forsterite are refractory and strong at high temperatures, dicalcium silicate softening only at 3524° F., and forsterite at 3398° F. Clinkers containing monticellite are soft at high temperatures, monticellite softening at 2700° F. In some cases, such as in metallurgical hearths, monticellite in minor amount may have utility. Periclase-fosterite clinkers are quite stable physically and chemically. However, they cannot be made from raw materials containing much lime, and even the small amount of lime which seems inevitably present in the best raw materials softens them to some extent. Periclase-dicalcium silicate clinkers can be made from raw materials containing quite large amounts of lime, but they are chemically and physically somewhat less stable than forsterite clinkers. Both dicalcium silicate and forsterite clinkers are much more difficult to burn than comparable monticellite clinkers. A desirable commercial refractory would be one in which the clinker could be easily and quickly coalesced to an impervious and dense structure. Furthermore, it would be so compounded in its ultimate form, as for instance brick, that it becomes more refractory than its component clinkers. A known practice has been to blend monticellite clinkers with other clinkers or materials containing excess CaO, such that the materials mutually correct each other to dicalcium silicate. Another method has been to add to a periclase-monticellite clinker enough lime, calcium ferrite, or other lime compound to form dicalcium silicate and eliminate the monticellite. A difficulty with these methods has been that they require chemical reaction of constituents which are well sealed in clinker grains, and thus involve a slow migration through a solid body, or first fusion and then reaction, but the fusion destroys volume-stability. The addition of calcium oxide or simple compound of calcium oxide also introduces difficulties, because they are atmospherically unstable, evolve disruptive gases in the burning process, or introduce materials deleterious to refractoriness. In accordance with my present invention, monticellite in periclase refractories may be corrected to dicalcium silicate in a novel manner not requiring the addition of unstable, expensive, disruptive, or deleterious compounds of CaO. It can be applied effectively to monticellite-periclase clinker fabricated into bricks, or to granular hearth refractories. By the present invention, the monticellite in even very coarse clinker grains can be corrected by additions to the fine matrix to obtain a desirable ingredient volume stability and strength at high temperatures. A further particularly surprising feature of the invention is that it becomes possible to reduce the silicon content and increase calcium. The process imparts a volume stability previously unobtainable in such compositions and to an entirely unexpected extent dries up such materials when heated at temperatures of about 3000° F. Other objects and advantages will appear from the following description.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

In accordance with the invention, periclase refractories containing monticellite, with or without dicalcium silicate, are subjected to the action of fluorspar. That this can result in an increase in the refractoriness is quite surprising, in that fluorspar has commonly been known as a low melting flux, and it is customarily added to glass, slags and enamels to lower the melting temperatures and promote fusion. The combination however including periclase as here, involves quite different factors. With refractory compositions based on periclase, the present process is particularly desirable with magnesia clinkers containing more than 80 to 90 per cent magnesia, and in general there is usually not much reason from a practical standpoint to operate the process in compositions below about 70 per cent MgO. And in general, up to about 10 per cent of fluorspar is applied. The amount required for correction in any given instance may be approximately determined by simple calculation. The ultimate composition that the refractory assumes without correction when fired to furnace temperature is determined. Then the molecular equivalent of CaO is subtracted from the molecular equivalent of twice the silica. This difference multiplied by 78 is the weight of fluorspar required. Otherwise expressed, the correction is as follows:

Let $x$ = per cent of $SiO_2 \div 60$ (molecular equivalent of $SiO_2$)

$y$ = per cent of $CaO \div 56$ (molecular equivalent of $CaO$)

Fluorspar required for correction = $(2x-y) 78$.

As an example, a clinker of the following chemical composition is to be made into a volume-stable brick:

| | Percent |
|---|---|
| $SiO_2$ | 5.78 |
| $Fe_2O_3$ | 4.50 |
| $Al_2O_3$ | 1.84 |
| $Cr_2O_3$ | 2.20 |
| CaO | 6.95 |
| MgO | 78.73 |

$x = 5.78 \div 60 = 0.094$
$y = 6.95 \div 56 = 0.124$

Fluorspar required = $(2 \cdot 0.094 - 0.124) 78 = 4.99$ lbs. fluorspar per 100 lbs. of clinker.

Often it may be desired to under- or over-correct. In ramming mixtures, as an example, some softness of clinker might be desirable. In such cases, the monticellite may be 70, 80 or 90% corrected. In other cases, in which a brick may be exposed to siliceous slags or silica drop, it may be desirable to over-correct to buff the silica pickup. The degree of correction most suitable for any given condition is best determined by empirical methods. The correction appears not to be at all critical and to be well achieved by a simple correction as exemplified above.

Apparently, magnesia isolates the fluorspar and prevents its abrupt reaction with silicates over narrow temperature ranges, but with higher temperatures the reactions proceeding to favorable results are consummated by diffusion and at temperatures of around 3000° F. are substantially complete. The systems so produced are devoid of liquid, and no traces of fluorine compounds are visible microscopically. In fact, the fluorine appears to be eliminated by volatilization as the temperature exceeds 2800° F., and samples which initially contain 6 per cent of fluorspar show less than a tenth of 1 per cent fluorine on analysis after heating to 3000° F. for 8 hours. A further pecularity is that oxides of silicon particularly, also iron and chromium to some extent, are removed. It will thus be readily seen that there is a fundamental distinction between the present process and the process of changing monticellite into dicalcium silicate by adding CaO. The correction of monticellite with CaO or its compounds, also, tends to provide parts of such refractories with excess CaO, while other parts contain unreacted monticellite even after long firing. CaO and its compounds also are subject to various kinds of uncontrollable and deleterious reactions, hydration, etc. In contrast, fluorspar or its reaction products have great mobility and substantially homogenize the system; and fluorspar being atmospherically and hydraulically stable, introduces no deleterious side reactions.

Where dicalcium silicate is a component of the working composition, on account of its tendency to invert, it is desirable to incorporate in the clinker during the original burning, a small amount of stabilizer, as known for such purpose, such as borates, phosphates, or chromates. For example borates in amount to give 0.06 per cent $B_2O_3$ in the refractory obviate any difficulty. It is also desirable to add a small amount of stabilizer, preferably $B_2O_3$, to the fines during the incorporation of fluorspar. If the brick is burned prior to sale, the dicalcium silicate formed will be stabilized by such addition. If the brick is sold as an unburned chemically-bonded refractory, inversion is less of a problem, as the predominant silicate at the inversion temperature will be unreacted monticellite.

While, as indicated, the invention may be applied to all refractory compositions containing magnesia as characteristic component, the following specific examples will illustrate the invention.

Brick: 30 per cent Guleman chrome ore containing 3 per cent of silica, and a sized magnesia clinker are compounded, the magnesia clinker having the composition: $SiO_2$ 4 per cent, $Fe_2O_3$ 3 per cent, $Al_2O_3$ 1 per cent, CaO 4 per cent, MgO 88 per cent, and $B_2O_3$ 0.05 per cent.

Batch:

| | Parts |
|---|---|
| Chrome ore −8 to 35 mesh | 30 |
| Clinker −8 to 35 mesh | 35 |
| Clinker −100 mesh | 35 |
| Fluorspar −100 mesh | 3.8 |
| Boric acid −100 mesh | 0.1 |

This brick composition may be chemically bonded with 1 part of $CaCl_2$ for example, dried in a humidity drier, and sold without firing. Alternatively, it may be formed with 1 part of "goulac" or sulphite liquor binder, dried and fired to 2800° F. for 4 hours, and be used as a burned brick.

Granular hearth material: A hearth material would be compounded from −4 mesh clinker of the composition: $SiO_2$ 5 per cent, $Fe_2O_3$ 6 per cent, $Al_2O_3$ 2 per cent, CaO 7 per cent, MgO 80 per cent. It would be tar-sealed, and for 100 parts of clinker 3.2 parts of −100 mesh fluorspar would be rolled onto the tar. This would be applied without slagging.

Other modes of applying the principle of the invention may be employed, change being made as regards the details described, provided the features stated in any of the following claims, or the equivalent of such, be employed.

I therefore particularly point out and distinctly claim as my invention:

1. A refractory comprising magnesia clinker at least 70 per cent, chromite, monticellite, and fluorspar in proportion to correct at least a part of the monticellite to a more refractory silicate.

2. A refractory comprising magnesia clinker at least 70 per cent, monticellite, and fluorspar in proportion to correct at least a part of the monticellite to a more refractory silicate.

3. A refractory comprising magnesia clinker at least 70 per cent, chromite, monticellite, dicalcium silicate, and fluorspar in proportion up to 10 per cent to correct at least a part of the monticellite to a more refractory silicate.

4. A refractory comprising magnesia clinker at least 70 per cent, monticellite, dicalcium silicate, and fluorspar up to 10 per cent.

5. A refractory comprising magnesia, a magnesia-containing silicate, and material consisting of fluorspar in proportion to react with such silicate and form a more refractory silicate.

6. A refractory of magnesia clinker containing at least 70 per cent of magnesia, chromite, and monticellite and fluorspar to correct at least a part of the monticellite to a more refractory silicate.

7. A refractory of magnesia clinker containing at least 70 per cent of magnesia, and monticellite and fluorspar to correct at least a part of the monticellite to a more refractory silicate.

8. A refractory of magnesia clinker and a low melting silicate and material consisting of fluorspar in proportion to react with such low melting silicate and form a higher melting silicate.

9. A process of making refractories, which comprises mixing chromite and at least 70 per cent magnesia, monticellite, and up to 10 per cent of fluorspar, forming into shapes, and firing.

10. A process of making refractories, which comprises mixing at least 70 per cent magnesia, monticellite, and up to 10 per cent of fluorspar, forming into shapes, and firing.

11. A process of making refractories, which comprises mixing at least 70 per cent magnesia, and monticellite, and up to 10 per cent of fluorspar.

12. A process of making refractories, which comprises removing silicon from a magnesia-monticellite refractory composition by adding fluorspar and firing.

13. A process of making refractories, which comprises obviating effects of silica absorbed from furnace drip, slag, vapors, etc., by adding material consisting of fluorspar to a magnesia refractory containing low melting silicate in proportion to react with such low melting silicate and form a higher melting silicate.

14. A process of making refractories, which comprises mixing ground burned magnesia and monticellite, and fluorspar in proportion to correct at least a part of the monticellite to a more refractory silicate.

15. A process of making refractories, which comprises reducing shrinkage in service temperature in a refractory of materials containing magnesia and monticellite by adding up to 10 per cent of fluorspar before firing.

16. A process of making refractories, which comprises converting monticellite in a periclase refractory to a more refractory silicate by adding fluorspar and firing.

ROBERT A. SCHOENLAUB.